Jan 6, 1931.  G. N. KNAPP  1,787,750
AUTOMATIC PIPE COUPLING
Filed Dec. 28, 1925   3 Sheets-Sheet 1
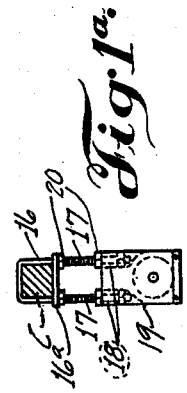
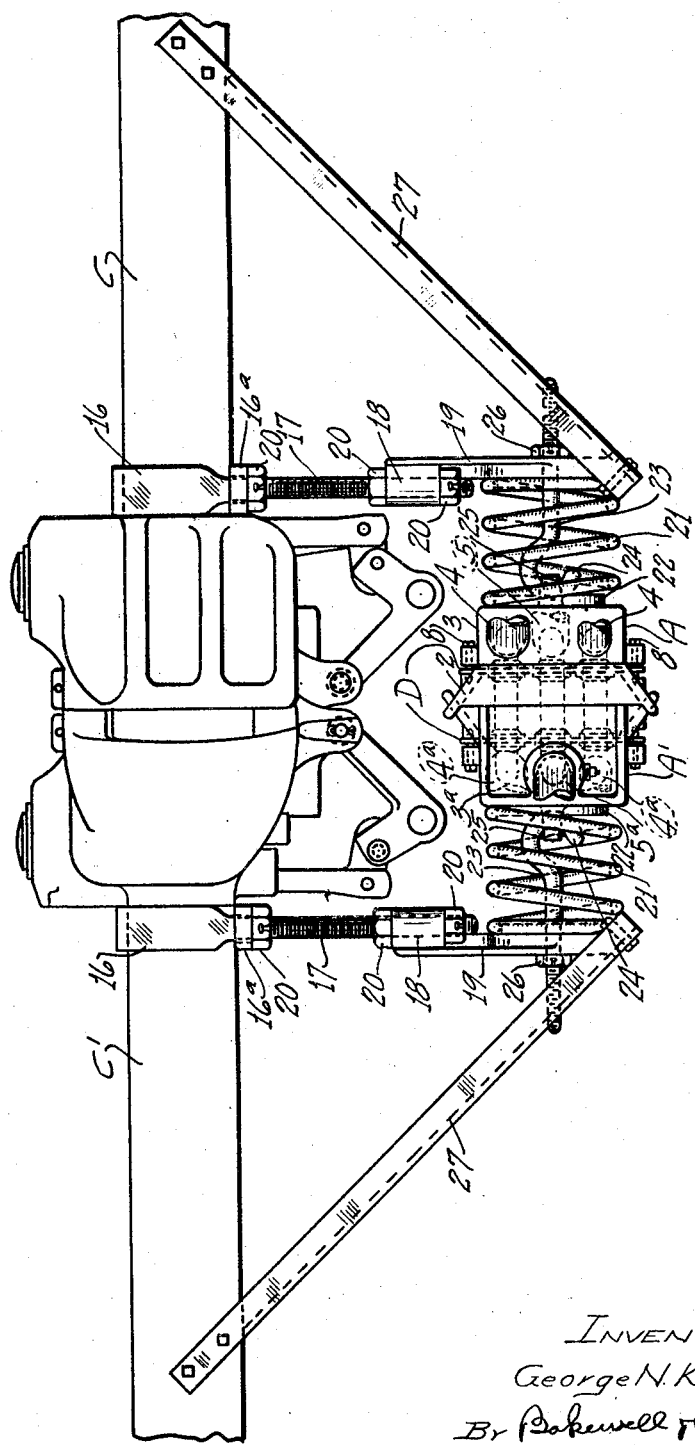
INVENTOR
George N. Knapp.
By Bakewell & Church
ATTORNEYS Jan 6, 1931. G. N. KNAPP 1,787,750
AUTOMATIC PIPE COUPLING
Filed Dec. 28, 1925 3 Sheets-Sheet 2
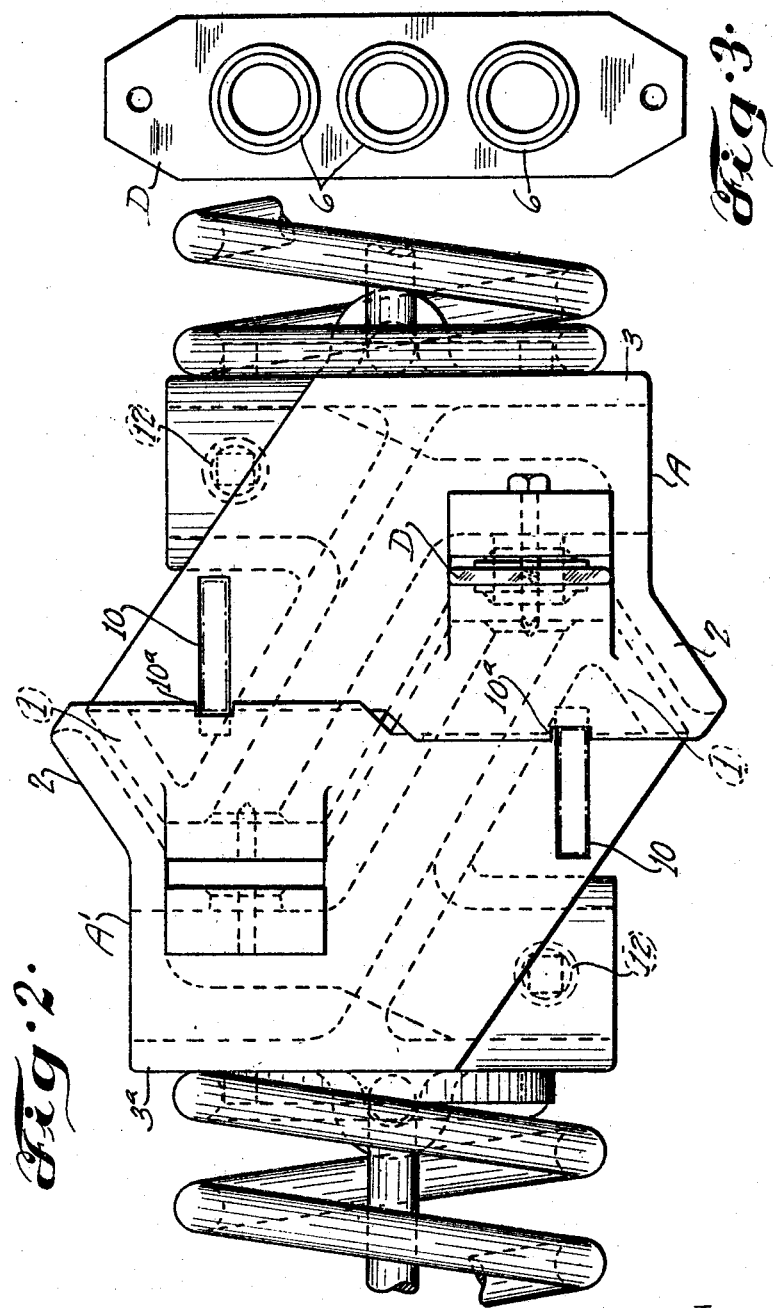
INVENTOR
George N. Knapp.
By Bakewell & Church
ATTORNEYS Jan 6, 1931. G. N. KNAPP 1,787,750
AUTOMATIC PIPE COUPLING
Filed Dec. 28, 1925 3 Sheets-Sheet 3
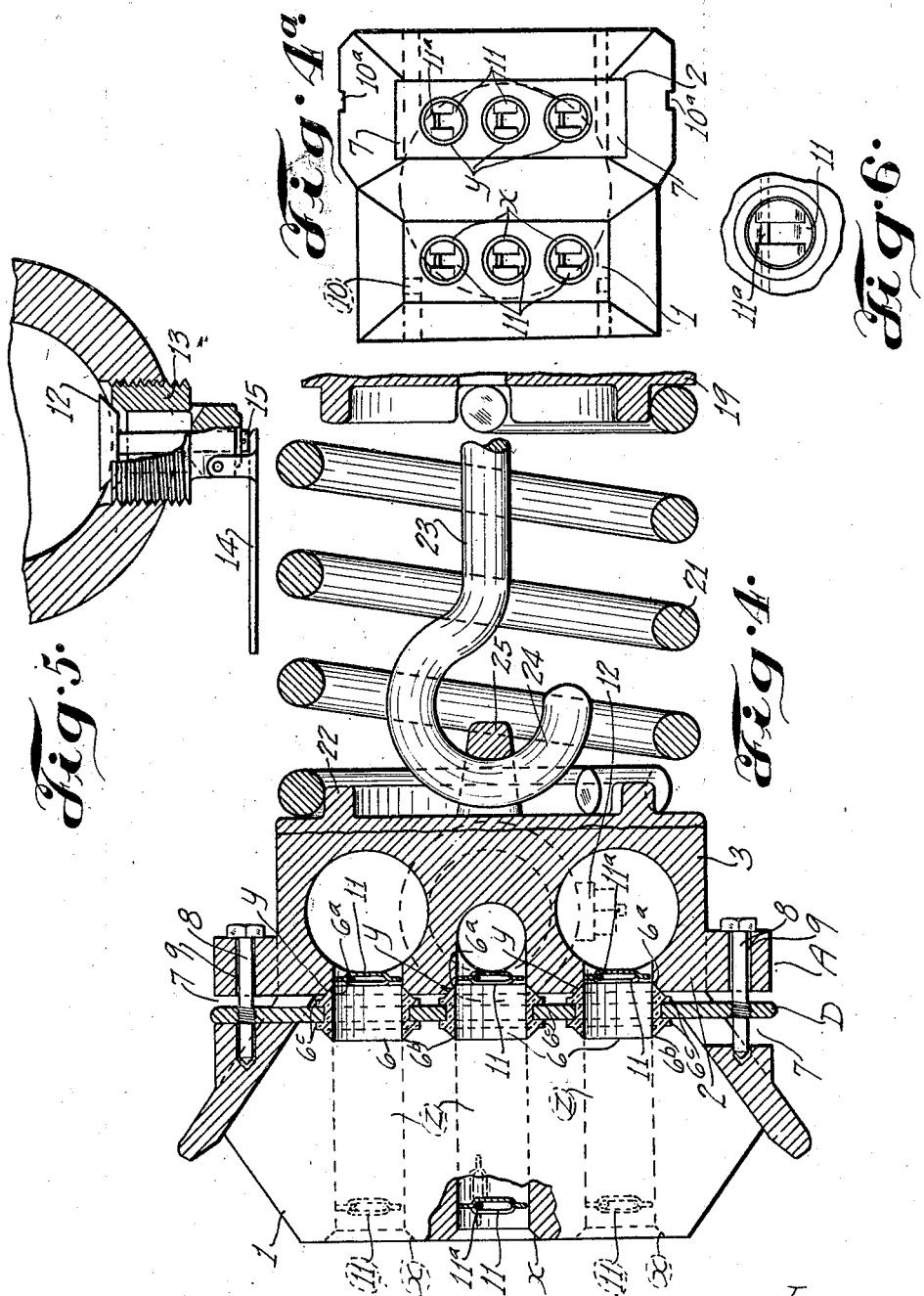
INVENTOR
George N. Knapp.
By Bakewell & Church
ATTORNEYS Patented Jan. 6, 1931

1,787,750

UNITED STATES PATENT OFFICE

GEORGE N. KNAPP, OF ST. LOUIS COUNTY, MISSOURI

AUTOMATIC PIPE COUPLING

Application filed December 28, 1925. Serial No. 77,966.

This invention relates to automatic pipe couplings, of the kind that are used on railway cars for automatically coupling the pipes of two adjacent cars.

One object of my invention is to provide an automatic pipe coupling that has the desirable features and characteristics of the pipe coupling described in my prior U. S. Patent No. 1,378,468, dated May 17, 1921, and which is equipped with double feather edged gaskets for producing tight joints between the aligned ports in the two complemental parts of the coupling when said parts come together.

Another object is to provide an automatic pipe coupling of the general type referred to, in which the gaskets used to produce tight joints between the complemental parts of the coupling are so constructed and arranged that they can be removed easily for inspection or replacement when the complemental parts of the couplings are in engagement with each other for coupling the pipes of two adjacent cars.

Figure 1 of the drawings is a side elevational view, illustrating my improved automatic coupling in operative position on the draw bars of two adjacent cars.

Figure 1ª is a detail view, illustrating the construction of the vertically-adjustable members on the draw bars that carry the complemental parts of the coupling.

Figure 2 is an enlarged top plan view, illustrating the complemental parts of the coupling in operative engagement with each other.

Figure 3 is a front elevational view of one of the gasket plates.

Figure 4 is a vertical longitudinal sectional view of one of the complemental parts of the coupling, showing the female member of said part in vertical section and the male member of said part in side elevation and partly broken away to illustrate the construction of the valves that are used to prevent insects, dirt and other foreign matter from entering the ducts or passageways in said part.

Figure 4ª is a front elevational view of one of the complemental parts of the coupling.

Figure 5 is a sectional view, illustrating one of the valves that is used to prevent water from remaining in one of the ducts or passageways of the coupling; and Figure 6 is a detail front elevational view of one of the valves that is used to prevent insects, dirt and the like from entering the passageways or ducts of the coupling.

Referring to the drawings which illustrate the preferred form of my invention, A and A' designate the two complemental parts of the coupling which are suspended by any suitable means from the draw bars C and C' of two adjacent cars equipped with pipes that are adapted to be connected together by the complemental parts A and A' of the coupling, said complemental parts being so constructed and arranged that they will move into operative engagement with each other when the cars come together.

Each of said complemental parts A and A' comprises a male member 1 and a female member 2 arranged in the same horizontal plane and so disposed with relation to each other that the male member 1 projects forwardly beyond the female member 2, as shown in broken lines in Figure 2. The male member 1 is of substantially frusto-pyramidal shape in form and is provided with four inclined walls that converge towards the front end of said male member, as shown in Figure 4ª. The female member 2 is provided with a socket of substantially frusto-pyramidal form whose internal dimensions are the same as the external dimensions of the male member 1, so that when the two complemental parts A and A' come together, the male member on the part A will enter the female member on the part A' and the male member on the part A' will enter the female member on the part A, even though said parts are slightly out of alignment with each other vertically or horizontally, or vertically and horizontally. The couplings can be designed to couple one or more pipes together, the coupling herein illustrated being so constructed that it will automatically couple three pipes on one car to three co-operating pipes on an adjacent car. Thus, as shown in Figures 1 and 2, the part A of the coupling is provided at its rear end with a pipe receiving portion 3 that has two pipes 4 attached to one end of same and a single pipe 5 attached to its opposite end. The part A' is provided at its rear end with a pipe receiving portion 3ᵃ that has a single pipe 5ᵃ attached to one end of same and which has two pipes 4ᵃ attached to its opposite end, as shown in broken lines in Figure 1, the pipes 4, 4 and 5ᵃ being arranged on one side of the coupling, and the pipes 4ᵃ, 4ᵃ and 5 being arranged on the other side of the coupling. Ducts or passageways are formed in the complemental parts A and A' of the coupling so as to establish communication between the pipes attached to said parts when said parts are in operative engagement with each other, said ducts communicating with ports formed in the front end of the male member 1 of each complemental part of the coupling, and in the rear end wall of the female member 2 of each complemental part of the coupling. Thus, as shown in Figure 4ᵃ three ports x are formed in the front end of the male member of each complemental part of the coupling, three ports y are formed in the rear end wall of the female member 2 of each of said parts and three ducts or passageways z are formed in each of said complemental parts so as to connect said ports together and establish communication between said ports and the pipes that are attached to the pipe receiving portions 3 of the parts A and A'.

Instead of mounting the gaskets directly on the female members of the coupling at such points that tapered feather edged portions of said gaskets will be engaged by tapered ports in the ends of the male members 1 of the coupling, when the complemental parts of the coupling come together, as described in my said prior patent, I form tapered ports in both the female members and the male members of the coupling and arrange double feather edged gaskets on the female members in such a way that the pressure of the medium flowing through the pipes which the coupling joins together will force said gaskets tightly against the female members and also tightly against the male members, thereby eliminating the possibility of leakage between the gaskets and either part of the coupling with which said gaskets co-operate. I also mount the gaskets on the complemental parts of the coupling in such a manner that they can be removed easily, even though said parts are in engagement with each other, thereby permitting the gaskets to be replaced or inspected when two adjacent cars are coupled together. In the preferred form of my invention, as herein illustrated, these desirable results are attained by providing each female member 2 of the coupling with a removable gasket plate D that is equipped with a set of gaskets 6, each of which gaskets has a feather edged, annular portion 6ᵃ that is adapted to fit snugly in one of the tapered ports y in the female member on which said gasket is mounted, and a feather edged, annular portion 6ᵇ that is adapted to fit snugly in the aligned tapered port x in the co-operating male member 1 on the other complemental part of the coupling when the parts A and A' come together. The gasket plate D is preferably constructed of metal and the gaskets 6 are constructed of rubber or other suitable material and are mounted in said plate in such a way that they can be removed from same after they have become worn or defective and replaced by perfect gaskets. In the form of my invention herein illustrated each of the gaskets 6 consists of a tubular member provided at points intermediate its feather edged portions 6ᵃ and 6ᵇ with parallel, laterally projecting flanges 6ᶜ that embrace the gasket plate D, as shown in Figure 4. The gasket plate D is arranged vertically in a slot 7 in the female member 2 which is of such dimensions that said gasket plate can move slightly relatively to said female member in a direction longitudinally of the coupling to cause the gaskets 6 to be pressed tightly against the tapered walls of the ports in the opposed portions of the complemental parts of the coupling when said parts come together, and said gasket plate is also mounted in such a manner that it can be bodily removed from said female member, without uncoupling the cars, by driving wedges between the male and female members of the coupling so as to force them apart slightly. As shown in Figure 4, each female member 2 of the coupling is provided in its top and bottom walls with vertically-aligned slots 7 that receive the end portions of the gasket plate D, said slots being enough wider than the thickness of the gasket plate to permit said plate to move towards and away from the inner end wall of the female member 2 in which the ports y are formed. The gasket plate D is supported and retained in operative position by guide pins 8 at the upper and lower ends of same that slide freely in horizontally-disposed holes 9 formed in the female member 2 at opposite sides of the slots 7, said guide pins 8 being connected to the gasket plate D by externally screw-threaded portions on said pins that are screwed into the gasket plate, as shown in Figure 4. When the complemental parts of the coupling come together the pressure which the male member of each of said parts exerts on the gaskets that co-operate with the ports x in the end of same causes the plate D on which said gaskets are mounted to be moved bodily towards the opposed inner end wall of the co-operating female member 2, thereby causing the gaskets to be pressed tightly against the complemental parts of the coupling. Due to the fact that the gaskets 6 have double feather edges which conform to the taper of the ports x and y with which they co-operate, the pressure of the medium that flows through the pipes which the coupling joins together will be exerted on the feather edges of said gaskets in such a way that it holds said feather edges in snug engagement with the tapered ports x in the male members and the tapered ports y in the female members, thereby effectively preventing leakage between the gaskets and the female members of the coupling or leakage between the gaskets and the male members of the coupling.

In order that the gasket plates D may be removed when two adjacent cars are coupled together with the complemental parts A and A' in operative engagement with each other, I form slots 10 in the complemental parts A and A' of the coupling, as shown in Figure 2, so as to receive wedges that can be inserted in said slots and driven downwardly so as to exert pressure on the edges of the top and bottom walls of the female members 2 of the coupling in a direction to force the complemental parts A and A' apart slightly or sufficiently to relieve the clamping pressure on the gaskets 6, and thus permit the gasket plates D to be withdrawn from the slots 7 in the female members after the guide pins 8 for said gasket plates have been removed, the slots 7 in the bottom walls of the female members being a trifle wider than the slots 7 in the top walls of said female members, so as to permit the gasket plates D to be tilted slightly, and thus facilitate the withdrawal of same. If desired, shallow notches 10ª can be formed in the edges of the top and bottom walls of the female members of the coupling at points in alignment with the slots 10, previously referred to, so as to receive the wedges that are used to separate the complemental parts of the coupling during the operation of removing the gasket plates when said complemental parts are in operative engagement with each other.

The complemental parts A and A' are provided with valves 11 for preventing insects, dirt and other foreign matter from entering the passageway z in said parts, or the pipes attached to said parts when the parts A and A' are not in operative engagement with each other. Said valves 11 may be of any preferred type or kind, so long as they are of such design that they will open automatically in a direction to permit the medium to flow through the pipes which the coupling joins together and can not reverse or assume an incorrect position, and thus cut off or impede the flow of the medium through said pipes. In the form of my invention herein illustrated pivotally mounted valves 11 are arranged in the passageway z in proximity to the ports x and y, said valves being sustained by horizontally-disposed pivot pins or hinge pins 11ª arranged so that said valves will normally assume a vertical position, as shown in full lines in Figure 4, and will swing upwardly into an inoperative position when a medium under pressure flows through the pipes that the coupling joins together.

The coupling herein illustrated is provided with a means for preventing water from remaining in a portion or portions of the coupling through which steam circulates when the coupling is in use. Said means consists of one or more drain valves 12 of any preferred type or kind arranged in the portions 3 and 3ª of the parts A and A' of the coupling. I prefer to use gravity-operated valves that will open automatically as soon as steam ceases to flow through the passageway in which said valves are arranged. It is obvious, however, that any other suitable type of valve might be employed, such, for example, as a valve that is normally held open by means of a spring. The drain valves 12 above referred to are arranged in the lower sides of the portions 3 and 3ª of the complemental parts A and A' of the coupling to which the pipes 5 and 5ª are attached, and each of said valves is provided with a valve seat 13 and an operating lever 14 that is combined with the stem 15 of the valve in such a way that it normally exerts pressure on the valve in a direction tending to hold the valve open, as shown in Figure 5. As soon as pressure is turned into the line formed by the pipes 5 and 5ª, the valves 12 close automatically and remain closed until the supply of steam is cut off from said line. The lever 14 not only forms an efficient means for holding the valve open, but said lever also constitutes a convenient means for manually raising and lowering said valves to dislodge foreign matter from the seat of the valve or from the guide through which the stem of the valve passes. With a coupling of the construction above described there is very little liability of the steam line breaking, due to water freezing in same, because any steam that condenses in the steam line will be able to escape freely through the drain openings with which the drain valves 12 are associated.

It is immaterial, so far as my broad idea is concerned, what means is used for suspending the complemental parts A and A' of the coupling from the draw bars C and C', but I prefer to use a means of the kind herein illustrated, on account of its simplicity and low cost of manufacture. As a similar means is used for sustaining each complemental part of the coupling, I will only describe the means that is used for sustaining the part A. Said means consists of a yoke 16 mounted on the draw bar C and provided with depending screw-threaded portions 17 that pass through a horizontally-disposed tie bar 16$^a$ and through lugs 18 on a plate or casting 19, the casting 19 being held in adjusted position on the screw-threaded portions of the yoke 16 by nuts 20. The part A is arranged in front of the casting 19 and is supported yieldingly on said casting by a heavy coiled spring 21 that is arranged horizontally, with its front end in engagement with a spring seat 22 on the portion 3 of the part A of the coupling and with its rear end in engagement with a spring seat on the casting 19. The part A is held in engagement with said spring 21 and said spring is held in engagement with the casting 19 by means of a horizontally-disposed rod 23 whose front end is connected to the part A by a universal joint formed by a hook 24 on said rod that passes through an eye 25 on the portion 3 of the part A, the rear end of said rod 23 being provided with screw threads so as to receive a nut 26 that bears against the rear side of the casting 19. An inclined strut, brace or other suitable device 27 is preferably combined with the casting 19 and with the draw bar C so as to take up the shock to which said casting is subjected when the complemental parts of the coupling move into engagement with each other, said member 27 being combined with the casting 19 in such a way as to permit said casting to be raised and lowered to change the elevation of the part A of the coupling.

A sustaining means of the construction above described is inexpensive to manufacture; it insures the complemental parts A and A′ of the coupling being maintained in such a position that they will be sure to move into operative engagement with each other, even though said parts are slightly out of alignment when the two cars come together; it permits the tension of the spring 21 to be varied simply by changing the position of the nuts 26 on the rods 23 and it permits the elevation of the complemental parts A and A′ of the coupling to be varied by raising and lowering the lugs 18.

Having thus described my invention, what I claim as new and desire to secure by Letters Patent is:

1. An automatic pipe coupling for railway cars, consisting of two complemental parts provided with co-operating male and female members, co-operating ports in the front end of each male member and in the inner end wall of each female member, a removable gasket plate in each female member arranged so that it can move bodily longitudinally of the coupling and having end portions positioned in openings in said member, and a sustaining means for said gasket plate that is adapted to be manipulated so as to permit said plate to be bodily withdrawn from the female member in which it is positioned.

2. An automatic pipe coupling for railway cars, consisting of two complemental parts provided with co-operating male and female members, co-operating tapered ports in the front end of each male member and in the inner end wall of each female member, and a removable gasket plate in each female member provided with double feather edged gaskets, for the purpose described, the complemental parts of the coupling having openings in which devices can be inserted to separate said parts when it is desired to remove said gasket plates without uncoupling the cars.

3. An automatic pipe coupling for railway cars, consisting of two complemental parts provided with co-operating male and female members, co-operating tapered ports in the front end of each male member and in the inner end wall of each female member, a removable gasket plate in each female member provided with double feather edged gaskets, the end portions of said gasket plate being arranged in slots in the walls of said female member which are of greater width than the thickness of said gasket plate, and a sustaining means for said gasket plate which permits it to move bodily relatively to the female member in which it is mounted when the complemental parts of the coupling come together.

4. An automatic pipe coupling for railway cars, consisting of two complemental parts provided with co-operating male and female members, co-operating ports in the front end of each male member and in the inner end wall of each female member, and a gasket plate provided with a plurality of gaskets mounted in a slot in each female member which is of such dimensions that the movement of the male member into the female member causes said gasket plate to move bodily longitudinally of the coupling and thus cause the gaskets to be clamped tightly enough between said male member and female member to effectively seal said ports.

5. An automatic pipe coupling for railway cars, consisting of two complemental parts provided with co-operating male and female members, co-operating ports in said members, a removable gasket plate mounted in a slot in each female member which is of such dimensions that the movement of the male members into the female members causes said gasket plates to move bodily longitudinally of the coupling, and means whereby the parts of the coupling may be separated sufficiently to permit the removal of said gasket plates from their slots without uncoupling the cars.

6. An automatic pipe coupling for railway cars, consisting of two complemental parts provided with co-operating male and female members, co-operating ports in said members, gaskets for sealing said ports mounted on one of said members, and means for enabling said gaskets to move longitudinally of the member on which they are mounted, and also move longitudinally of the coupling, and become clamped tightly between opposed surfaces on said male and female members when the male member enters the female member.

GEORGE N. KNAPP.